US007145570B2

(12) United States Patent
Emberling et al.

(10) Patent No.: US 7,145,570 B2
(45) Date of Patent: Dec. 5, 2006

(54) MAGNIFIED TEXTURE-MAPPED PIXEL PERFORMANCE IN A SINGLE-PIXEL PIPELINE

(75) Inventors: Brian D. Emberling, San Mateo, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 139 days.

(21) Appl. No.: 10/317,599

(22) Filed: Dec. 12, 2002

(65) Prior Publication Data

US 2003/0169271 A1  Sep. 11, 2003

Related U.S. Application Data

(63) Continuation-in-part of application No. 10/094,934, filed on Mar. 11, 2002, now Pat. No. 6,847,372.

(51) Int. Cl.
*G09G 5/00* (2006.01)
(52) U.S. Cl. ........................................ 345/582; 345/629
(58) Field of Classification Search ................. 345/629, 345/582, 581, 419
See application file for complete search history.

(56) References Cited

U.S. PATENT DOCUMENTS

| 5,341,439 | A | 8/1994 | Hsu | |
|---|---|---|---|---|
| 5,594,846 | A | 1/1997 | Donovan | |
| 6,181,346 | B1 * | 1/2001 | Ono et al. | 345/582 |
| 6,239,808 | B1 * | 5/2001 | Kirk et al. | 345/582 |
| 6,304,268 | B1 * | 10/2001 | Iourcha et al. | 345/428 |
| 6,353,438 | B1 * | 3/2002 | Van Hook et al. | 345/552 |
| 6,366,290 | B1 * | 4/2002 | Dye et al. | 345/582 |
| 6,704,026 | B1 * | 3/2004 | Kurihara et al. | 345/629 |
| 6,734,850 | B1 * | 5/2004 | Deering | 345/419 |
| 6,914,610 | B1 * | 7/2005 | Lavelle et al. | 345/581 |

FOREIGN PATENT DOCUMENTS

EP    0 890 925 A2    1/1999

* cited by examiner

*Primary Examiner*—Kee M. Tung
*Assistant Examiner*—Jin-Cheng Wang
(74) *Attorney, Agent, or Firm*—Meyertons Hood Kivlin Kowert & Goetzel, P.C.; Jeffrey C. Hood; Martin R. Wojcik

(57) ABSTRACT

A system and a method for improving magnified texture-mapped pixel performance in a single-pixel pipeline. A plurality of textured pixel addresses corresponding to a plurality of pixels may be generated. A FIFO or other memory unit may be used to linearly order the plurality of textured pixel addresses. Two consecutive textured pixel addresses out of the plurality of textured pixel addresses may be examined if they map to a common set of texels in texture space. The two consecutive textured pixel addresses may be merged together and propagated down the pipeline if they map to the common set of texels. However, only a first of the two consecutive textured pixel addresses may be propagated down the pipeline if the two consecutive textured pixel addresses do not map to a common set of texels. Texel data may be generated in response to receiving either the combined texel structure or the first of the two textured pixel addresses. The texel data may be filtered using one or more texture filters in order to generate texture values. The next two textured pixel addresses that may be examined by the merge unit include the subsequent two consecutive textured pixel addresses, or a second of the two consecutive textured pixel addresses and a subsequent consecutive textured pixel address.

25 Claims, 12 Drawing Sheets

MAGNIFIED TEXTURE-MAPPED PIXEL PERFORMANCE IN A SINGLE-PIXEL PIPELINE

CONTINUATION DATA

This is a continuation-in-part of application Ser. No. 10/094,934 titled "Improving Magnified Texture-Mapped Pixel Performance in a Single-Pixel Pipeline" filed Mar. 11, 2002 now U.S. Pat. No. 6,847,372, whose inventors are Brian D. Emberling and Michael G. Lavelle, and which is assigned to Sun Microsystems Corporation.

CROSS REFERENCE TO RELATED APPLICATIONS

The following patents and/or patent applications are related to the present application.

U.S. patent application Ser. No. 10/094,934 titled "Improving Magnified Texture-Mapped Pixel Performance in a Single-Pixel Pipeline" filed Mar. 11, 2002, whose inventors are Brian D. Emberling and Michael G. Lavelle, and which is assigned to Sun Microsystems Corporation.

BACKGROUND OF THE INVENTION

1. Field of the Invention

This invention relates generally to the field of computer graphics and, more particularly, to performance optimization of graphics pipelines.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as information specifying vertex parameters of polygons (e.g., triangles), NURBS (Non-Uniform Rational B-Splines), subdivision surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer. Alternatively, the samples may be filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from the converters is conveyed to a display device such as a computer monitor, LCD display, or projector.

Many implementations of graphics systems may have a limited amount of space available for implementing a graphics processor. Improvements are possible in the implementation of a graphics pipeline, especially the processing of textured pixel addresses. Therefore it would be advantageous to improve the performance of a graphics processor without generating many additional components.

SUMMARY OF THE INVENTION

The problems set forth above may at least in part be solved in some embodiments by a system or method for improving magnified texture-mapped pixel performance in a single-pixel pipeline.

A graphics pipeline may be operable to process textured pixel addresses. The graphics pipeline may comprise a texture address unit, a texture buffer, and one or more texture filters. The texture address unit may comprise one or more texture address generators and a merge unit. Each of these units in the graphics pipeline may be coupled together through FIFO memories.

One or more texture address generators can generate a plurality of textured pixel addresses corresponding to a plurality of pixels. In other words, each of the plurality of pixels may have a corresponding textured pixel address. The generation of each textured pixel address may be performed using any of the algorithms known in the art. Two consecutive textured pixel addresses may then be passed to a next unit in the pipeline (e.g., the merge unit). A FIFO or another memory unit may be used to store the textured pixel addresses propagated from the one or more texture address generators. As a result, the textured pixel addresses may be ordered linearly. The FIFO may be able to store two or more textured pixel addresses at the same time.

The merge unit may be used to examine the two consecutive textured pixel addresses received from the one or more texture address generators. This examination may determine if the two consecutive textured pixel addresses correspond to a common set of texels in texture space (or map to a same texel). The merge unit may merge the two consecutive textured pixel addresses if the two consecutive textured pixel addresses correspond to the common set of texels. Merging may operate to create a combined texel structure.

The merge unit may access the FIFO by using a FIFO read pointer, such as a ReadPtr. The merge unit is operable to examine the two consecutive textured pixel addresses in the FIFO without affecting the ordering of the textured pixel addresses in the FIFO. For example, the merge unit may be operable to peek at the two consecutive textured pixel addresses without removing the two consecutive textured pixel addresses from the FIFO. For example, in a case where the two consecutive textured pixel addresses are to be merged together, the merge unit may access the FIFO at ReadPtr and ReadPtr+1. As a result, the two consecutive textured pixel addresses in the FIFO may be accessed at the start of the FIFO in order to be examined, and the FIFO read pointer may be repositioned to point to a third and a fourth consecutive textured pixel addresses. In other words, the subsequent third and fourth consecutive textured pixel addresses may be the next two consecutive textured pixel addresses. The merge unit may then merge the two consecutive textured pixel addresses.

On the other hand, the two consecutive textured pixel addresses may not map to the same texel. In this case, only the first of the two consecutive textured pixel addresses may be propagated to the next stage of the pipeline. In other words, the merge unit may not merge the two consecutive textured pixel addresses. The merge unit may access the FIFO at ReadPtr to retrieve the first of the two consecutive textured pixel addresses. The second of the two consecutive textured pixel addresses may remain in the FIFO and be available for examination with a subsequent consecutive textured pixel address. In this case, the value of the ReadPtr may increment only by one value. Furthermore, the next two consecutive textured pixel addresses to be examined may include the second of the two consecutive textured pixel addresses and the subsequent, or a third, consecutive textured pixel address.

The texture buffer may receive the combined texel structure from the merge unit. The texture buffer may generate texel data for the two consecutive textured pixel addresses. Specifically, the texel data may be generated by processing the combined texel structure if the two consecutive textured pixel addresses map to the same texel. Alternatively, texel data may be generated for only the first of the two consecutive textured pixel addresses. Specifically, texel data may be generated by processing the first of the two consecutive textured pixel addresses if the two consecutive textured pixel addresses do not map to the same texel.

The texture buffer may be operable to generate texel data in the same amount of time regardless of whether it receives the combined texel structure (including the merged two consecutive textured pixel addresses) or the first of the two consecutive textured pixel addresses. As a result, the texel data may contain data for the two consecutive textured pixel addresses or only the first of the two textured pixel addresses. In both cases the texel data may be propagated to the next unit in the pipeline, e.g., the one or more texture filters.

Next, the one or more texture filters may filter the texel data received from the texture buffer in order to generate at least one texture value. The one or more texture filters may generate a first and a second texture value if the one or more texture filters receive the combined texture structure. Alternatively, the one or more texture filters may generate only the first texture value if the one or more texture filters receive only the first of the two consecutive textured pixel addresses.

In another embodiment, the system may further include a split unit, which may be operable to receive the texel data from the texture buffer and split the texel data into first texel data and second texel data, collectively referred to as the split texel data. The split texel data may be propagated to the one or more texture filters. For example, if examining determines that the two consecutive textured pixel addresses map to the same texel, the split unit may split the texel data. However, if examining determines that the two consecutive textured pixel addresses do not map to the same texel, the split unit may propagate only the first texel data to the one or more texture filters.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
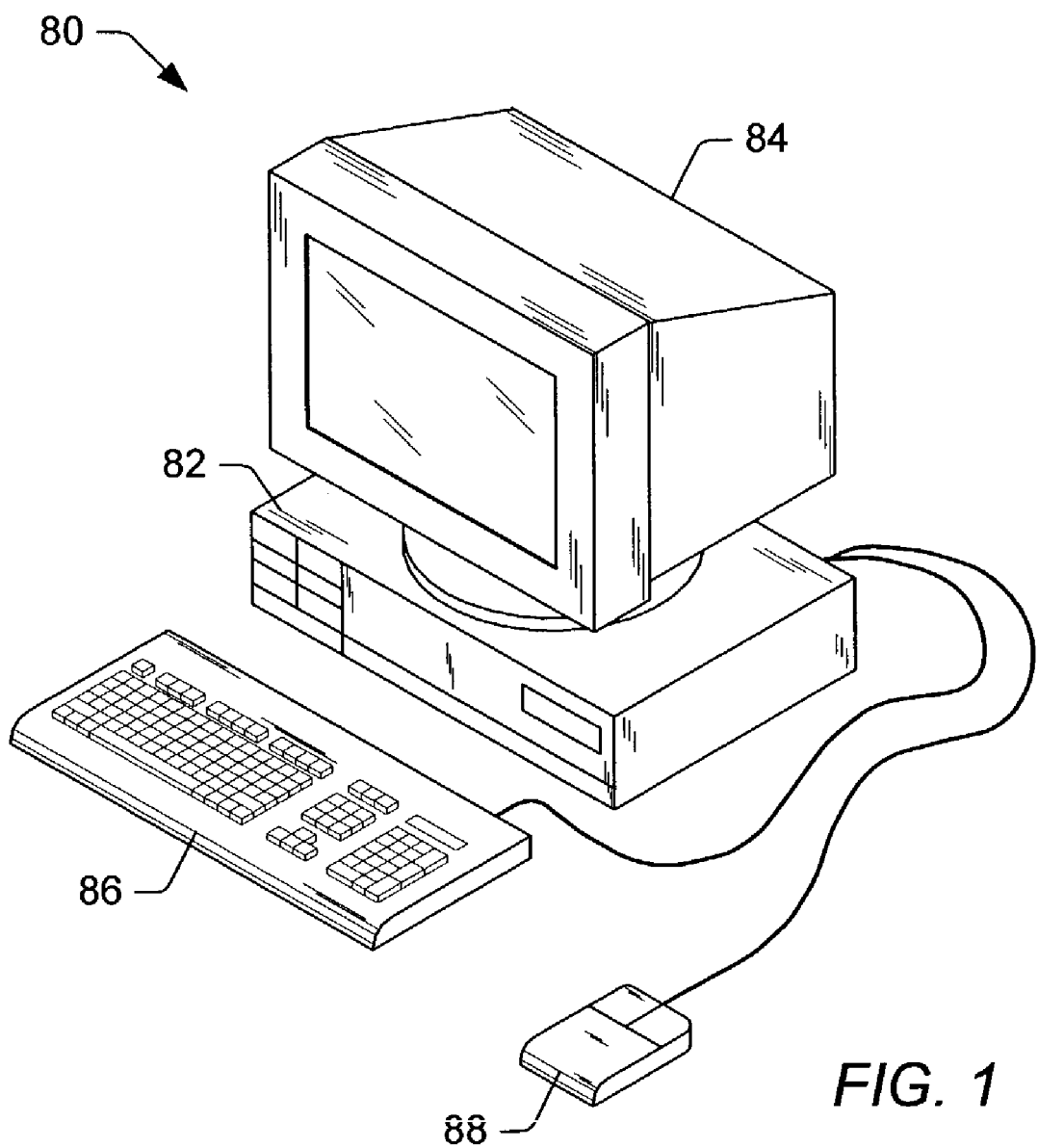
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Incorporation By Reference

U.S. patent application Ser. No. 10/094,934 titled "Improving Magnified Texture-Mapped Pixel Performance in a Single-Pixel Pipeline" and filed Mar. 11, 2002 (5181-88000) is hereby incorporated by reference in its entirety as though fully and completely set forth herein.

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
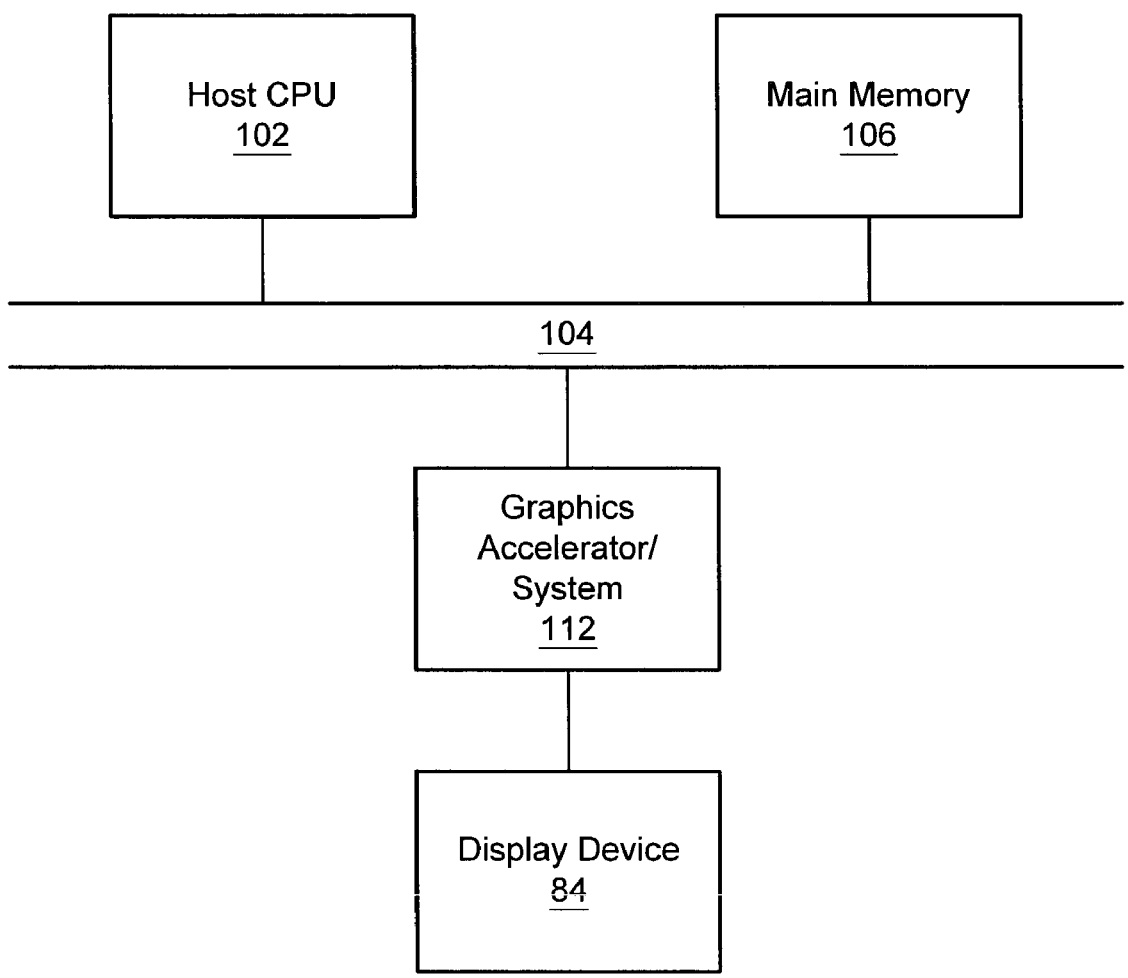
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
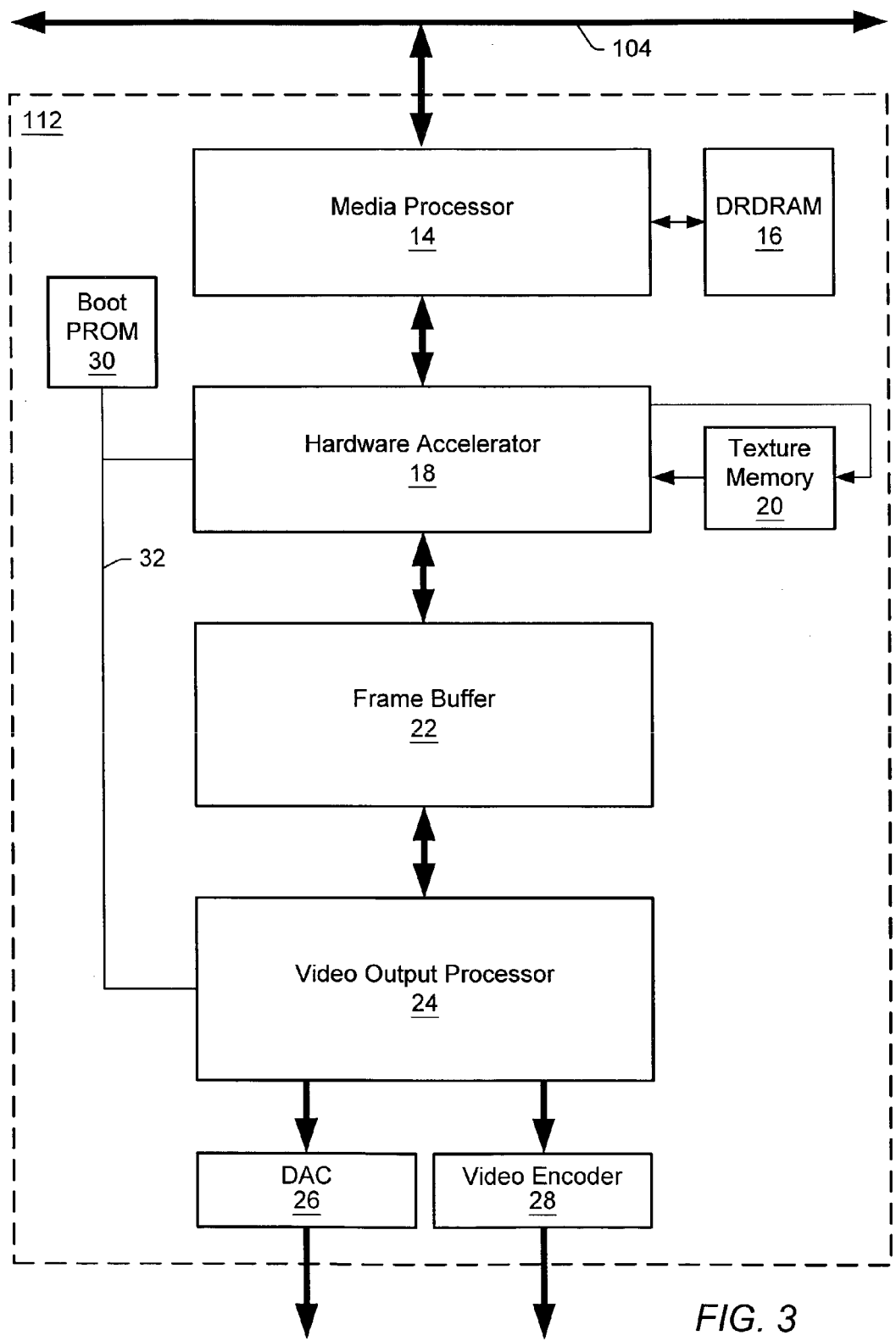
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
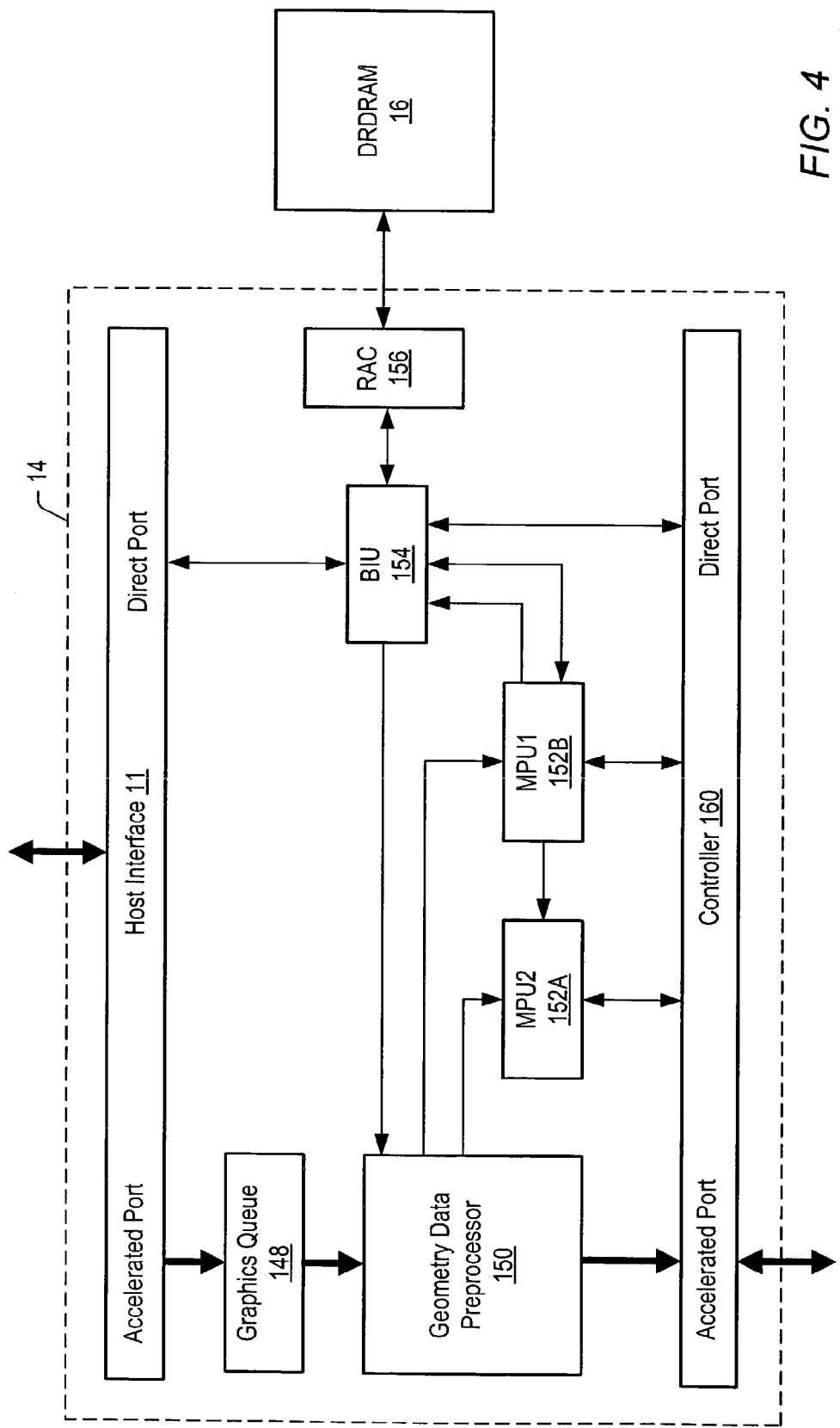
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
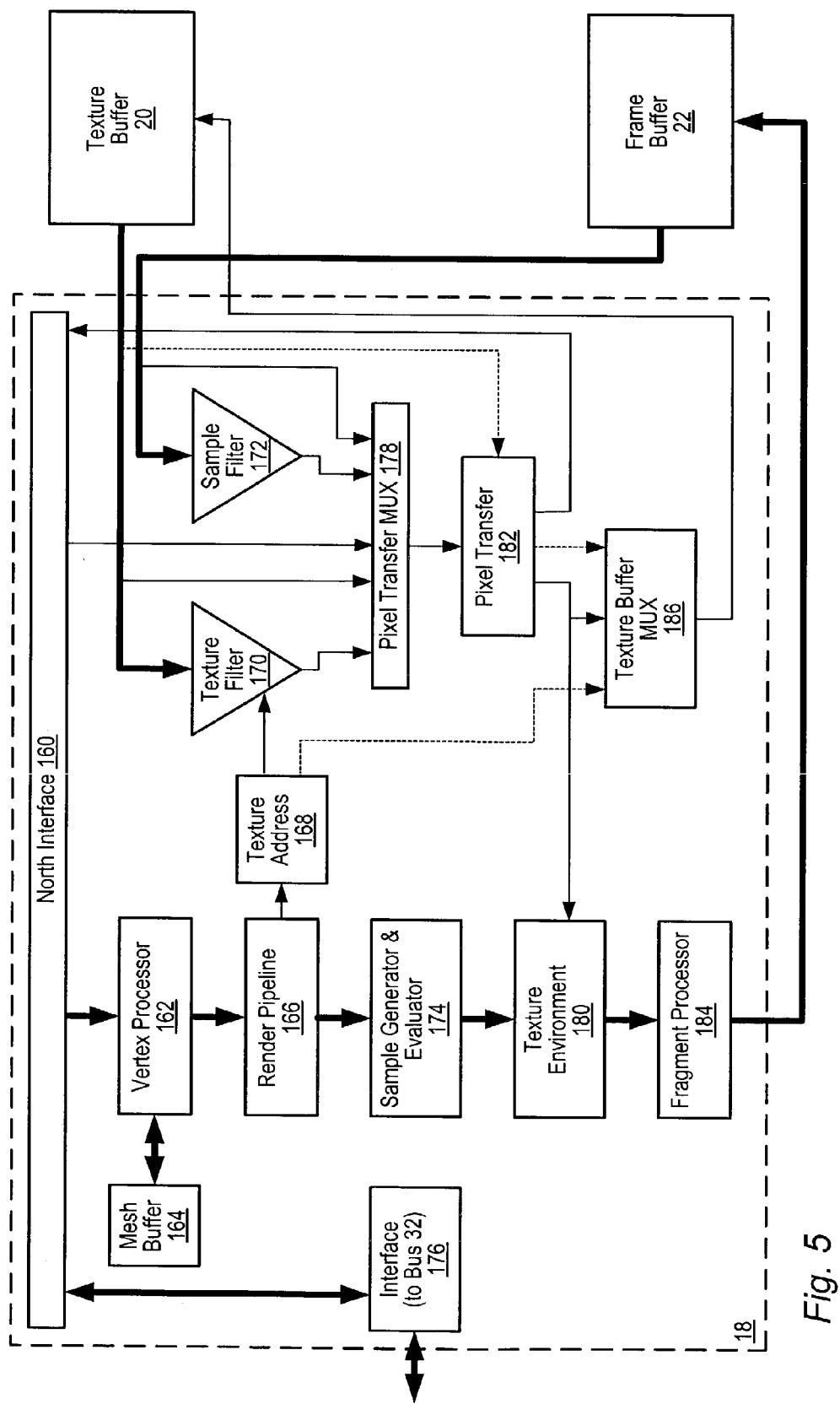
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e. transparency);
z (i.e. depth); and
s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
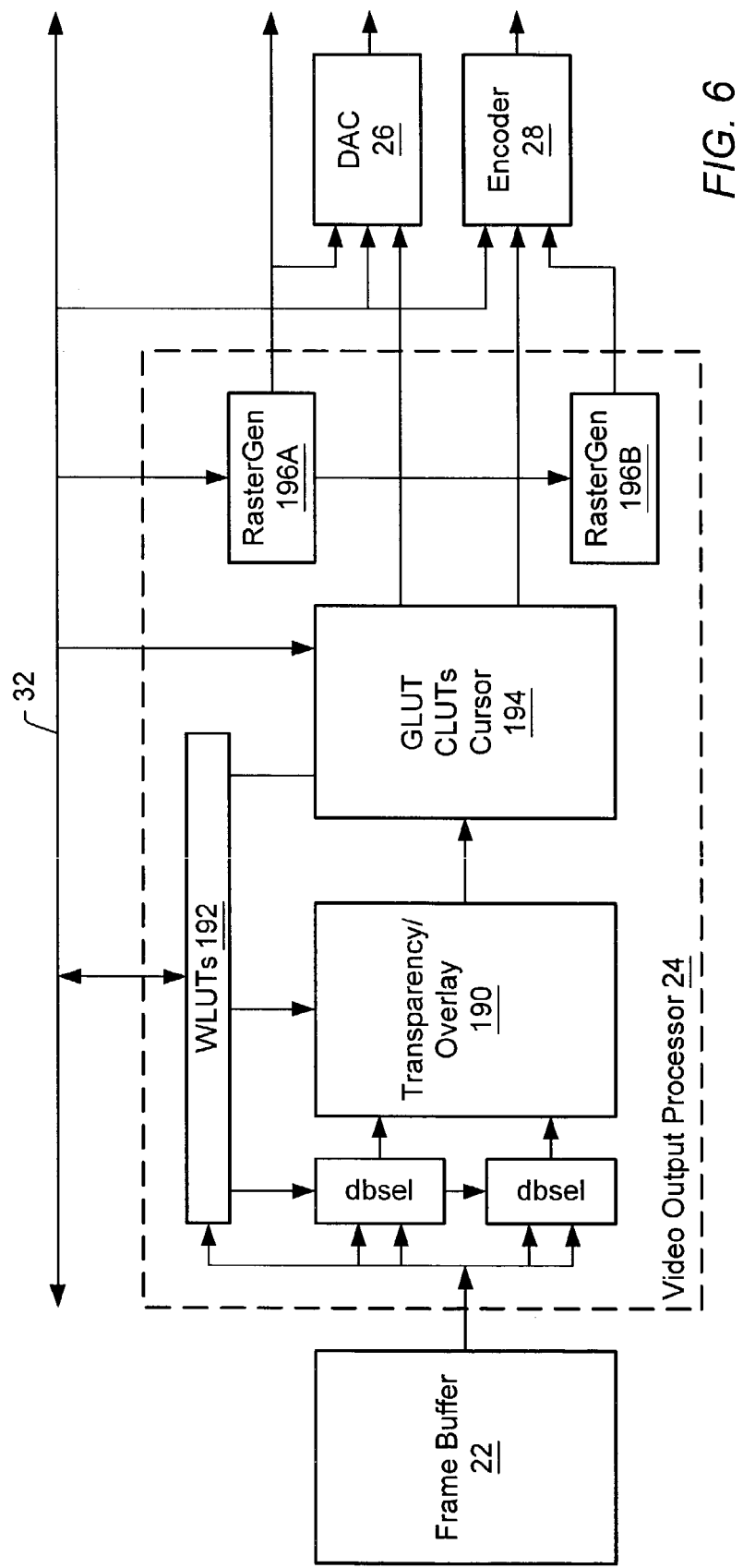
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, headmounted displays, and so forth) through DAC 26 and/or video encoder 28.

Figure 7:
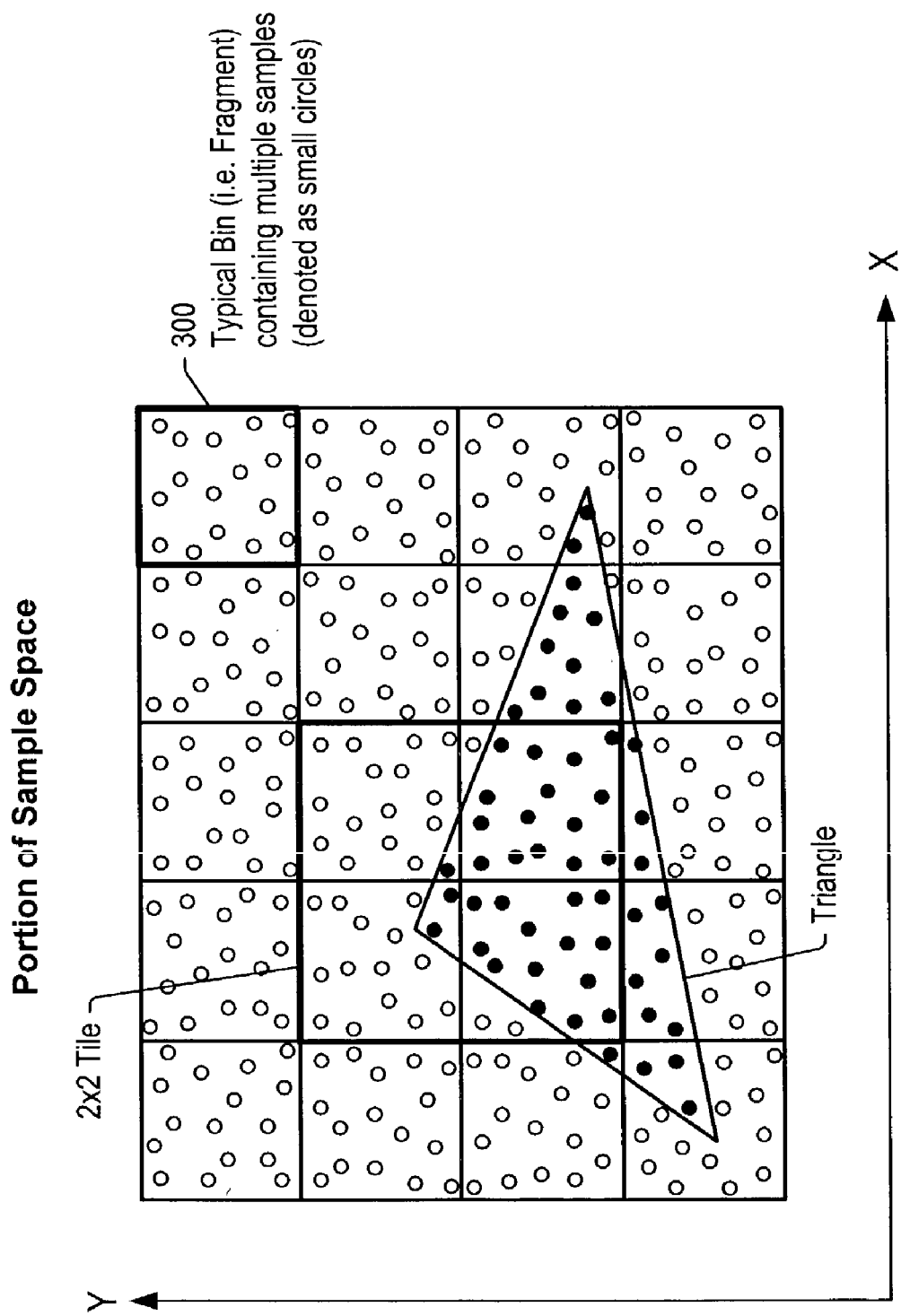
FIG. 7 is an illustration of a texture space partitioned into an array of bins, according to one embodiment.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Figure 8A:
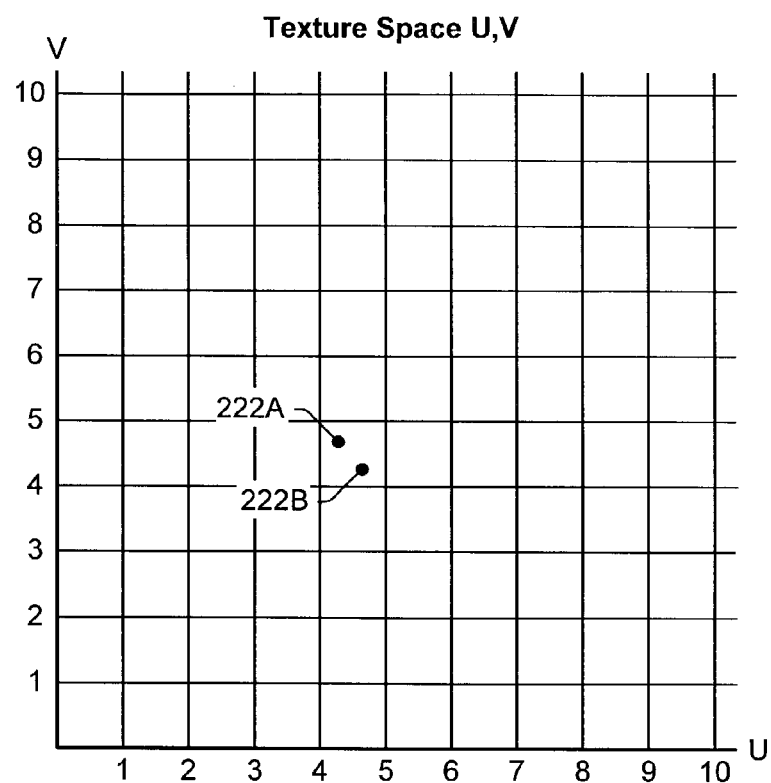
FIG. 8A is an illustration of a texture space partitioned into an array of bins, according to one embodiment.

Texture Space Partitioned into an Array of Bins—FIG. 8A

FIG. 8A is an illustration of a texture space partitioned into an array of bins, according to one embodiment. The texture space may include U and V coordinates, which may correspond to horizontal and vertical coordinates respectively. FIG. 8A shows a portion of the actual texture space where the U and V coordinates are marked with exemplary units. A pixel in screen space may correspond to a textured pixel address in texture space. Therefore, referring to FIG. 8A, two textured pixel addresses 222A and 222B in texture space may correspond to two pixels (not shown) in screen space.

Each textured pixel address may include U and V coordinates. The U and V coordinate each may include an integer and a fractional component. For example, referring to FIG. 8A, the textured pixel address 222A may have (U, V) coordinates of (4.3, 4.8). For example, referring to the textured pixel address 222A, the integer component of the U coordinate of the textured pixel address 222A may have the value of 4 and the fractional component of the U coordinate of the textured pixel address 222A may have the value of 0.3.

In one embodiment, the two pixels, corresponding to the textured pixel addresses 222A and 222B respectively, may map to the same texel (or correspond to a common set of texels) if the integer component of the textured pixel address 222A is the same as the integer component of the textured pixel address 222B. The fractional components of the textured pixel address 222A and the textured pixel address 222B may be different.

When rendering textured mapped images, there may be a mixture of minified and magnified textured pixels. Although the ratio of minified versus magnified textured pixels may be equal, the percentage of pixels on the screen may be dominated by a few magnified triangles, i.e., that may be used to render the sky and ground in a flight simulator. Therefore, performance gains may be realized by using a method for improving magnified textured-mapped pixel performance in a single-pixel pipeline. In one embodiment, for each magnified pixel, each step in screen space may correspond to less then one texel step in texture space. Screen space may use X and Y coordinates for mapping pixels, whereas texture space may use U and V coordinates for mapping texels.

Figure 8B:
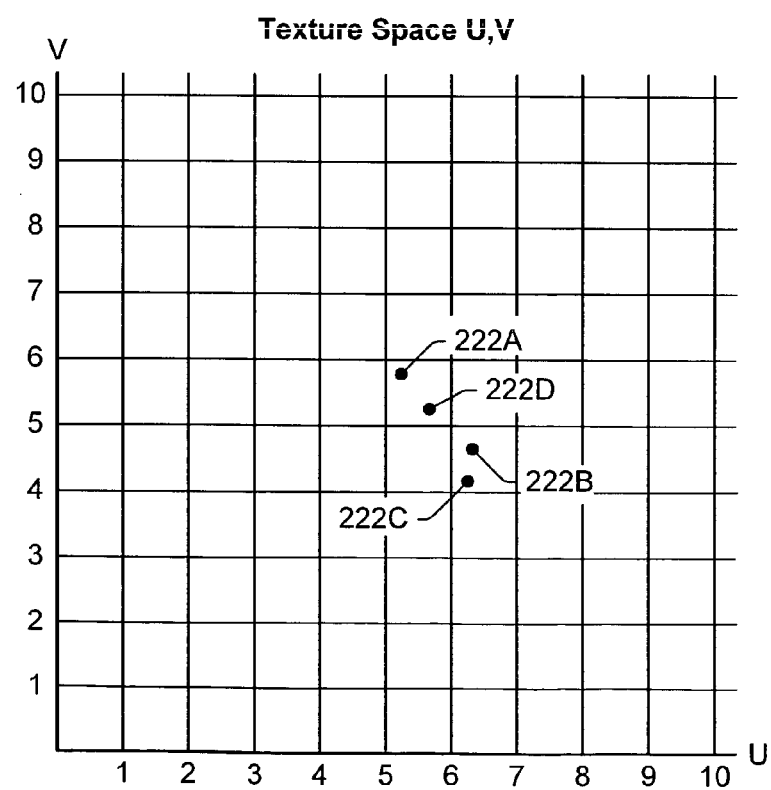
FIG. 8B is an illustration of a texture space partitioned into an array of bins, according to another embodiment.

Texture Space Partitioned into an Array of Bins—FIG. 8B

FIG. 8B is an illustration of the texture space partitioned into an array of bins, according to another embodiment. FIG.

8B shows a portion of the actual texture space where the U and V coordinates are marked with exemplary units.

In one embodiment, the textured pixel addresses 222A and 222B may not map to the same texel, or in other words, the textured pixel addresses 222A and 222B may not correspond to a common set of texels. Specifically, the integer component of the textured pixel address 222A may be different from the integer component of the textured pixel address 222B, resulting in a different texel, or a different set of texels, for each of the first textured pixel address 222A and the second textured pixel address 222B.

The textured pixel address 222A and a textured pixel address 222D may map to the same texel. The textured pixel address 222B and a textured pixel address 222C may map to another texel. The relationship between the textured pixel addresses 222A–D will be explained below with reference to FIG. 10.

Figure 9:
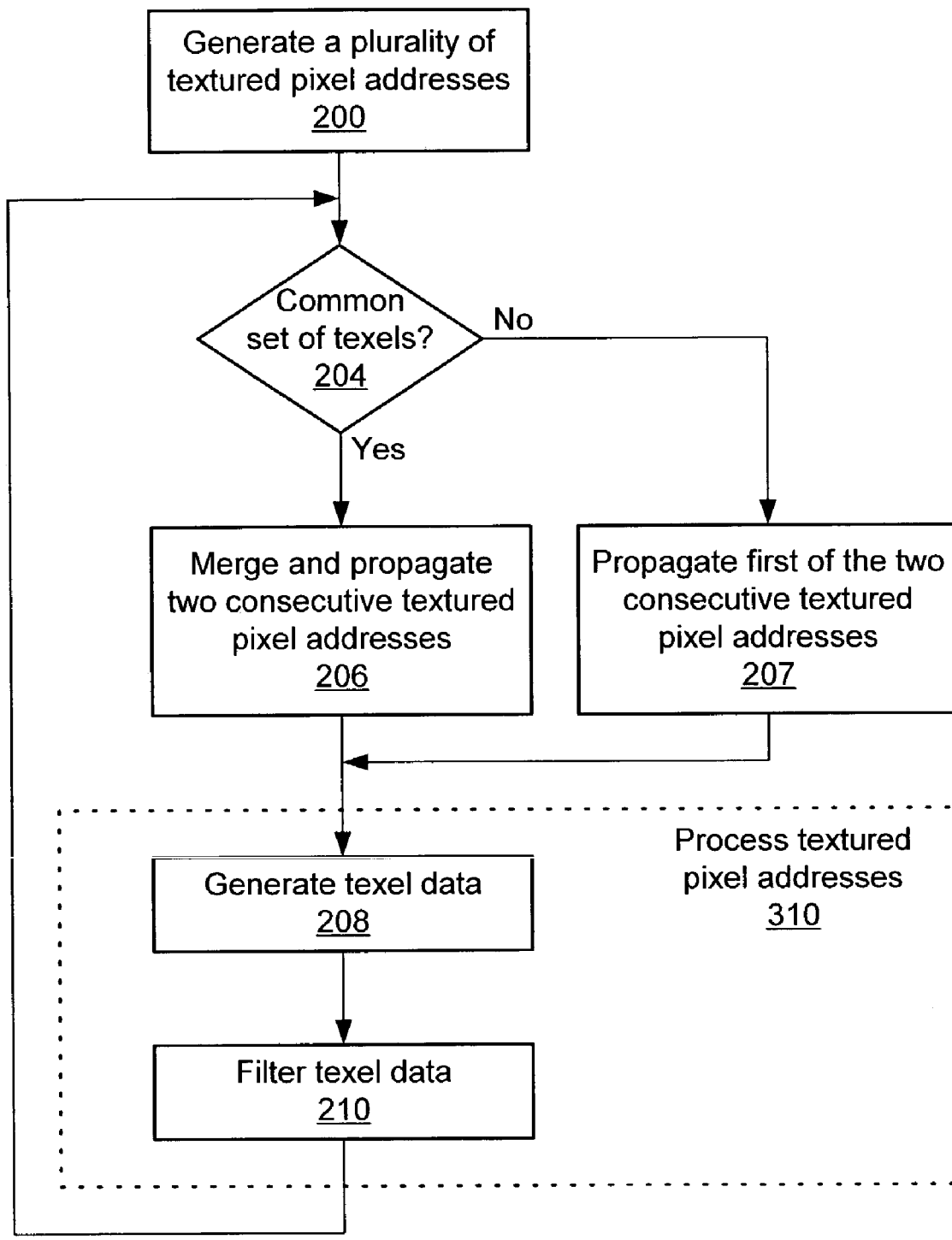
FIG. 9 is a flowchart illustrating a method for improving magnified textured-mapped pixel performance in a single-pixel pipeline, according to one embodiment.

A Method for Improving Magnified Textured-Mapped Pixel Performance in a Single-Pixel Pipeline—FIG. 9

FIG. 9 is a flowchart illustrating a method for improving magnified textured-mapped pixel performance in a single-pixel pipeline, according to one embodiment. One embodiment of the single-pixel pipeline is described below with reference to FIG. 11A (or 11B). In step 200, a plurality of textured pixel addresses may be generated from a plurality of pixels using one or more texture address generators, such as the texture address generators 168A and 168B of FIG. 11A (or 11B). Each of the plurality of textured pixel addresses may map to a corresponding pixel of the plurality of pixels. The generation of a textured pixel address from a plurality of pixels may be performed using any of the algorithms known in the art. Two consecutive textured pixel addresses may then be passed to the next unit in the pipeline, such as the merge unit 168C of FIG. 11A (or 11B), according to one embodiment.

In step 204, the two consecutive textured pixel addresses may be examined to determine if the two consecutive textured pixel addresses map to a same texel (or correspond to a common set of texels). For example, the textured pixel addresses 222A and 222B may map to the same texel, such as described above with reference to FIG. 8A. In another example, the textured pixel addresses 222A and 222B may not map to the same texel, such as described above with reference to FIG. 8B.

Figure 11A:
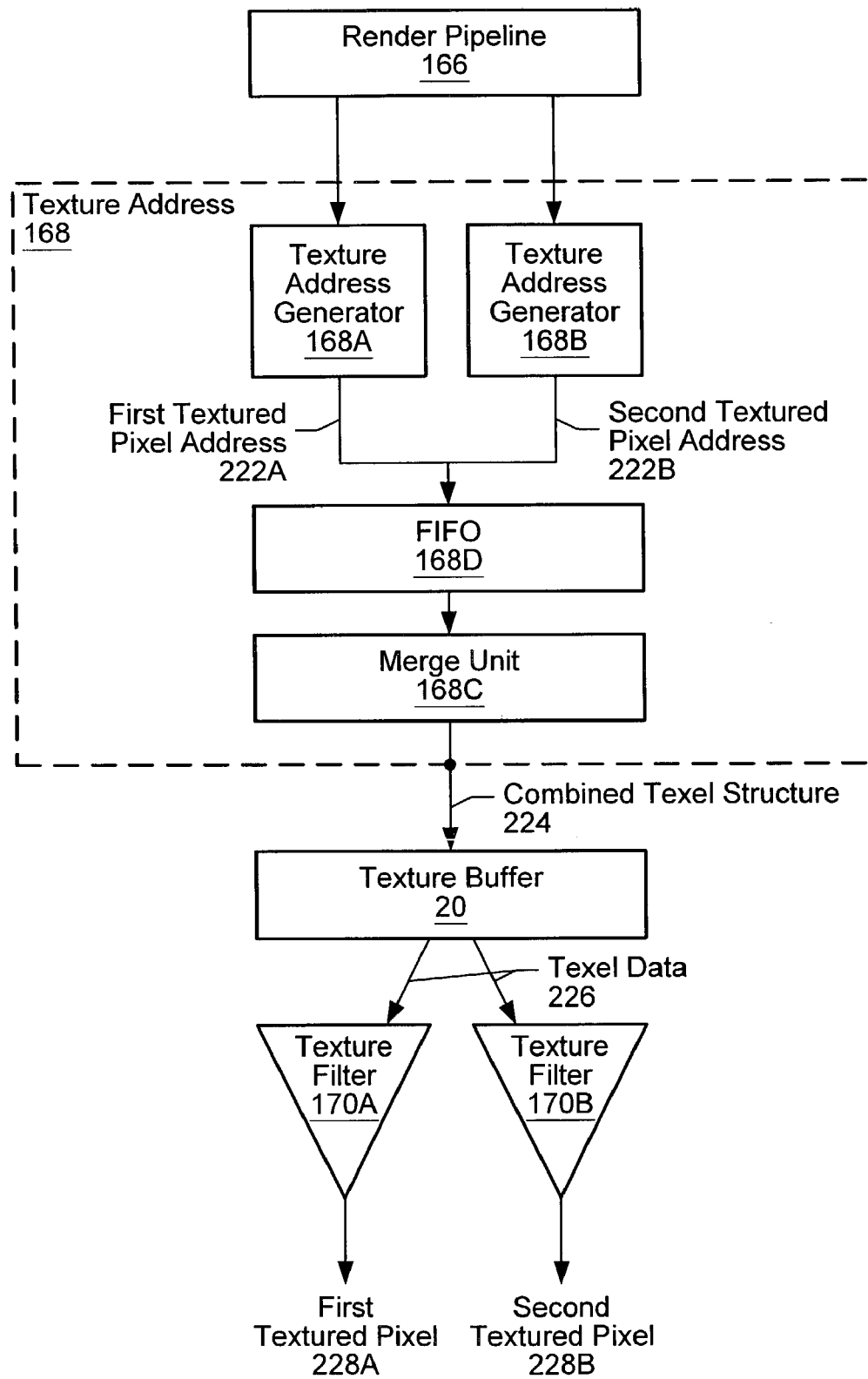
FIG. 11A is a block diagram of the system used to improve magnified textured-mapped pixel performance in a single-pixel pipeline, according to one embodiment.

Referring now to FIG. 11A (or 11B), the two consecutive textured pixel addresses may be examined using the merge unit 168C. The merge unit 168C may receive the two consecutive textured pixel addresses from the one or more texture address generators 168A and 168B. This examination may determine if the two consecutive textured pixel addresses correspond to a common set of texels in the texture space. In one embodiment, this examination may be performed by control logic. The control logic may be included in the merge unit 168C, and may generate control bits that indicate the result of the examination.

In step 206, the two consecutive textured pixel addresses may be merged and propagated to a next pipeline stage if the examination indicates that the first textured pixel address and the second textured pixel address correspond to the common set of texels. As a result, the two consecutive textured pixel addresses may be merged together to create a combined texel structure 224, also referred to herein as a single result or two merged consecutive textured pixel addresses.

If the examination in 204 indicates that the two consecutive textured pixel addresses do not correspond to the same texel, then in 207 only the first of the two consecutive textured pixel addresses may be propagated to the next stage in the pipeline. The second of the two consecutive textured pixel addresses may be held back, e.g., the ReadPtr is incremented by 1 The second of the two consecutive textured pixel addresses may be examined with a subsequent consecutive textured pixel address out of the plurality of the textured pixel addresses. This process is described with more detail below with reference to FIG. 10.

In step 208, texel data 226 may be generated in response to receiving either 1) the combined texel structure 224 or 2) the first of the two consecutive textured pixel addresses. Referring now to FIG. 11A, the texel data may be generated using a texture buffer 20, also referred to herein as a texture memory unit 20. In one embodiment, the texture buffer 20 may generate texel data 226 for one or more textured pixel addresses at the same time. For example, in step 207, only the first of the two consecutive textured pixel addresses may be propagated down to the texture buffer. In this case, the texture buffer may generate texel data corresponding to only one textured pixel address.

In step 210, the texel data 226 may be filtered in order to generate one or more texture values. Referring now to FIG. 11A (or 11B), the texel data received from the texture memory unit 20 may be filtered using one or more texture filters 170A and 170B in order to generate a first and a second texture value 228A and 228B respectively, also referred to as a first textured pixel 228A and a second textured pixel 228B respectively.

The steps of generating and filtering the texel data in order to generate the one or more texture values may be collectively referred to as processing textured pixel addresses 310.

The steps of examining the two consecutive textured pixel addresses, merging and propagating the two consecutive textured pixel addresses or only propagating the first of the two consecutive textured pixel addresses, and processing may be repeated in plurality in order to facilitate operation of the graphics pipeline.

In another embodiment, if the examination indicates that the two consecutive textured pixel addresses do not map to the same texel, then only the second of the two consecutive textured pixel address may be propagated to the next stage in the pipeline, e.g., the texture buffer, and the first of the two consecutive textured pixel addresses may be held back and examined with a subsequent consecutive textured pixel address out of the plurality of the textured pixel addresses.

It is noted that the flowchart of FIG. 9 is exemplary only. Further, various steps in the flowchart of FIG. 9 may occur concurrently or in different order than that shown, or may not be performed, as desired. Also, various additional steps may be performed as desired.

Figure 10:
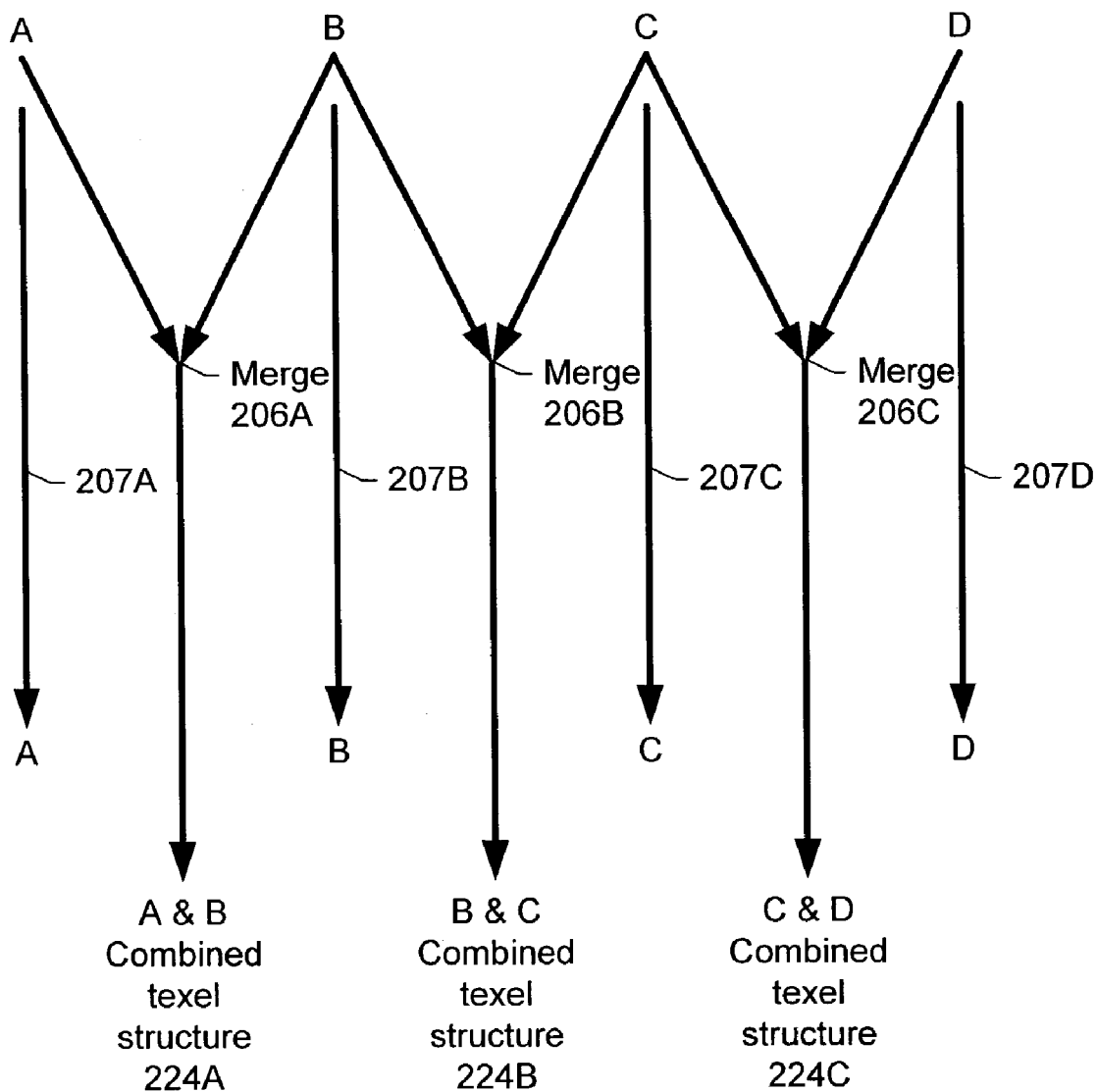
FIG. 10 is a diagram illustrating merging and propagating textured pixel addresses, according to one embodiment.

FIG. 10—An Example of Pixel Processing

FIG. 10 illustrates one example of the method for improving magnified textured-mapped pixel performance in a single-pixel pipeline, according to one embodiment. For example, a rendering pipeline may produce four pixels pA, pB, pC, and pD (not shown) out of a plurality of pixels. Each of the four pixels pA, pB, pC, and pD may correspond to a textured pixel address, such as the textured pixel addresses 222A–D, herein referred to as textured pixel addresses A–D respectively, as described above with reference to FIG. 8B.

The first two consecutive textured pixel addresses may include the textured pixel addresses A and B. In one case, the textured pixel addresses A and B may map to different texels, such as the textured pixel addresses 222A and 222B with reference to FIG. 8B. In this case, the textured pixel address A may be processed independently 207A from the textured pixel address B. In other words, only the textured pixel address A may be propagated to the next stage, and the textured pixel address B may be held back, such as described above in step 207 with reference to FIG. 9.

In the case where the textured pixel address B was held back, the next consecutive textured pixel address is the textured pixel address C. In other words, the next two consecutive textured pixel addresses may be the textured pixel addresses B and C. The textured pixel address C may map to the same texel as the textured pixel address B, such as the textured pixel addresses 222B and 222C with reference to FIG. 8B. In this case, the textured pixel addresses B and C can be merged and propagated together 206B as a combined texel structure 224B, such as described above in step 206 with reference to FIG. 9. However, if the textured pixel addresses A and B do not map to the same texel, then the textured pixel address B may be processed independently 207B from the textured pixel address C, in which case the textured pixel address C may be held back.

On the other hand, the textured pixel addresses A and B may map to the same texel, such as the textured pixel addresses 222A and 222B with reference to FIG. 8A. In this case, the textured pixel addresses A and B may be merged and propagated together 206A as a combined texel structure 224A, such as described above in step 206 with reference to FIG. 9.

Likewise, the textured pixel addresses C and D may be examined if they map to the same texel if the textured pixel address C has not already merged with the textured pixel address B. In this case, if the textured pixel addresses C and D map to the same texel, then the textured pixel addresses C and D may be merged and propagated together 206C as a combined texel structure 224C. Otherwise, the textured pixel address C may be processed independently 207C of the textured pixel address D.

Therefore, in one embodiment each textured pixel address may have two chances to be merged with other textured pixel addresses.

It is noted that the diagram of FIG. 10 is exemplary only. Further, various steps in the diagram of FIG. 10 may occur concurrently or in different order than that shown, or may not be performed, as desired. Also, various additional steps may be performed as desired.

System Used to Improving Magnified Textured-Mapped Pixel Performance in a Single-Pixel Pipeline—FIG. 11A FIG. 11A shows one embodiment for a block diagram of the system used to improve magnified textured-mapped pixel performance in a single-pixel graphics pipeline. In other embodiments, the pipeline may be used for general purpose applications.

A graphics pipeline may be operable to process textured pixel addresses. The graphics pipeline may comprise a texture address unit, a texture buffer, and one or more texture filters. In one embodiment, a plurality pixels may be propagated down the single-pixel graphics pipeline, or a render pipeline 166, to the texture address unit 168. The texture address unit 168 may comprise the one or more texture address generators 168A and 168B and the merge unit 168C. The one or more texture address generators 168A and 168B may be operable to generate a plurality of textured pixel addresses, also referred to as a plurality of texture coordinates, corresponding to the plurality of pixels. The generation of a textured pixel address from a plurality of pixels may be performed using any of the algorithms known in the art.

In one embodiment, the texture address unit 168 may further include a FIFO (first-in first-out memory) 168D, which may be coupled to the one or more texture address generators 168A and 168B and the merge unit 168C. The one or more texture address generators 168A and 168B may write the textured pixel addresses into the FIFO 168D, thus imposing a linear ordering on the textured pixel addresses. Due to the linear ordering of the textured pixel addresses, the merge unit 168C may be operable to compare two consecutive textured pixel addresses.

The merge unit may access the FIFO by using a FIFO read pointer, such as a ReadPtr. The merge unit 168C is operable to examine the two consecutive textured pixel addresses in the FIFO without affecting the ordering of the textured pixel addresses in the FIFO. For example, the merge unit may be operable to peek at the two consecutive textured pixel addresses without removing the two textured pixel addresses from the FIFO.

In one embodiment, the merge unit 168C may examine the two consecutive textured pixel addresses at ReadPtr and ReadPtr+1, where ReadPtr is the FIFO 168D read pointer. The two consecutive textured pixel addresses may be merged together to create two merged consecutive textured pixel addresses, herein also referred to as a combined texel structure 224. The combined texel structure may be propagated to the texture buffer 20. As a result of the merging operation the FIFO ReadPtr may be incremented by two, thus pointing to a subsequent consecutive textured pixel address.

In one embodiment, if the two consecutive textured pixel addresses cannot be merged, a single textured pixel address, such as the first of the two consecutive textured pixel addresses may be sent to the texture buffer 20 and the ReadPtr is incremented only by one. In other words, the second of the two consecutive textured pixel addresses may be held back in the FIFO such that it may be examined with a subsequent consecutive textured pixel address.

In one embodiment, the FIFO may have a depth greater than or equal to two textured pixel addresses. Other forms of storing and retrieving textured pixel addresses may be contemplated, such as a circular queue or a linked list, among others. The operation of the ReadPtr or a similar read pointer, will depend on the choice of memory type for storing and ordering the textured pixel addresses.

In one embodiment, the merge unit 168C may comprise control logic (not shown), operable to examine texel requirements of each of the two consecutive textured pixel addresses in order to create control bits indicating whether the two corresponding pixels have identical texel composition. The merge unit 168C may be operable to create the combined texel structure 224 if the control bits indicate identical texel composition for the two consecutive textured pixels. An example of examining texel requirements for the two consecutive textured pixel addresses is described above with reference to FIGS. 8–10.

In one embodiment, the texture memory unit 20, also referred to as the texture buffer 20, may be operable to receive the combined texel structure 224 from the merge unit 168C. The texture memory unit 20 may be further operable to generate texel data 226. The texture memory unit 20 may be operable to generate the texel data 226 for one or more textured pixel addresses at the same time.

In one embodiment, the one or more texture filters 170A and 170B, also referred to as a first texture filter 170A and a second texture filter 170B respectively, may be operable to receive the texel data 226 from the texture memory unit 20. The one or more texture filters 170A and 170B may be further operable to filter the texel data 226 to generate two textured pixels 228A and 228B, also referred to as a first textured pixel 228A and a second textured pixel 228B respectively. The first and second texture filters 170A and 170B may use both the integer and fractional components of the U and V coordinates.

It is noted that the block diagram of FIG. 11A is exemplary only. Further, various modules in the block diagram of FIG. 11A may be connected in different order than that shown, or may not be present, as desired. Also, various additional modules may be included as desired.

Figure 11B:
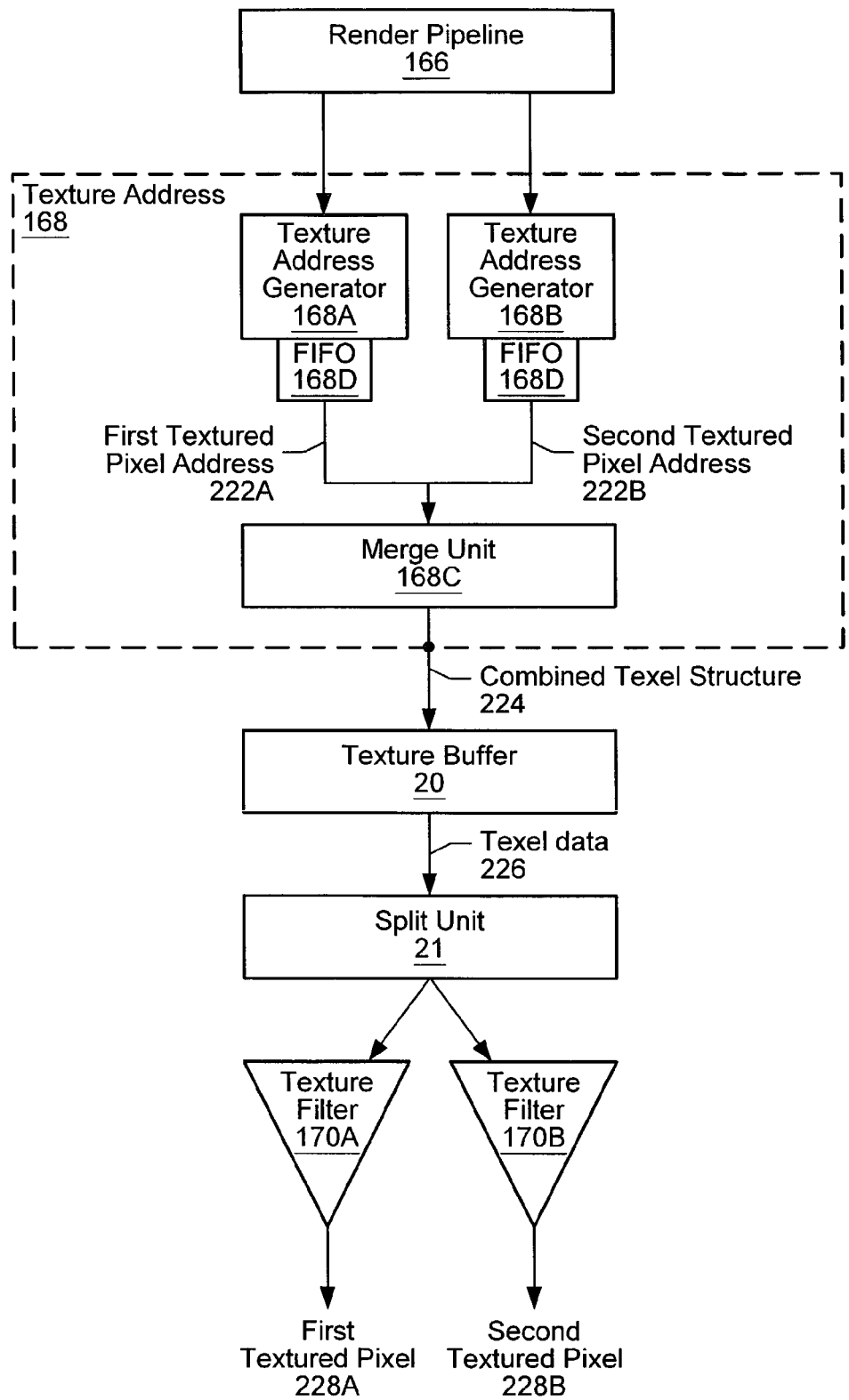
FIG. 11B is a block diagram of the system used to improve magnified textured-mapped pixel performance in a single-pixel pipeline, according to another embodiment.

Another System Used to Improving Magnified Textured-Mapped Pixel Performance in a Single-Pixel Pipeline—FIG. 11B FIG. 11B shows another embodiment for a block diagram of the system used to improve magnified textured-mapped pixel performance in a single-pixel pipeline. Other embodiments and/or combinations of embodiments may also be contemplated.

In one embodiment, the FIFO 168D may be distributed between the one or more texture address generators 168A and 168B. Specifically, there may be two or more FIFO's, each FIFO associated with a corresponding texture address generator.

In one embodiment, the system may further include a split unit 21. The split unit 21 may be operable to receive the texel data 226 and split the texel data 226 into a first texel data and a second texel data, collectively referred to as split texel data. The split texel data may be propagated to the one or more texture filters 170A and 170B. For example, if examining determines that the two consecutive textured pixel addresses map to the same texel, the split unit 21 may split the texel data since the texel data may have been generated for the combined texel structure. However, if examining determines that the two consecutive textured pixel addresses do not map to the same texel, the split unit 21 may propagate only the first texel data to the one or more texture filters 170A and 170B.

It is noted that the block diagram of FIG. 11B is exemplary only. Further, various modules in the block diagram of FIG. 11B may be connected in different order than that shown, or may not be present, as desired. Also, various additional modules may be included as desired.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

The invention claimed is:

1. A method of comprising:
   examining a first set of two consecutive textured pixel addresses including a textured pixel address and a second textured pixel address of a plurality of textured pixel addresses stored in a buffer to determine if the two consecutive textured pixel addresses map to a same texel;
   wherein if the two consecutive textured pixel addresses do map to the same texel, then:
   reading a set of texel data corresponding to said same texel for use in filtering a texture value;
   writing the set of texel data to one or more texture filter units;
   filtering the set of texel data in said texture filter units to obtain a texture value for the first textured pixel address of the set of two consecutive textured pixel addresses;
   filtering the set of texel data in said texture filter units to obtain a texture value for the second textured pixel address of the set of two consecutive textured pixel addresses;
   removing the first set of two consecutive textured pixel addresses from the buffer;
   examining a second set of textured pixel addresses including a former third and fourth textured pixel addresses; and
   displaying an image on a display based on at least one of the texture values.

2. The method of claim 1, wherein if the two consecutive textured pixel addresses do not map to the same texel, then the method further comprises:
   reading a set of texel data corresponding to the first textured pixel address of the two consecutive textured pixel addresses;
   writing the set of texel data to one or more texture filter units;
   filtering the set of texel data in said texture filter units to obtain a texture value for the first textured pixel address;
   removing the first textured pixel address from the buffer; and
   examining a second set of two consecutive textured pixel addresses including the former second and third textured pixel addresses.

3. The method of claim 2, wherein each textured pixel address comprises U and V coordinates, wherein the U and V coordinates each comprises an integer and a fractional component.

4. The method of claim 3, wherein said examining uses the integer components of the U and V coordinates for each of the two consecutive textured pixel addresses.

5. The method of claim 1, wherein the plurality of textured pixel addresses are ordered linearly.

6. The method of claim 5, wherein the buffer is operable to linearly order the plurality of textured pixel addresses.

7. The method of claim 6, wherein the buffer comprises one or more of: one or more FIFO queues; one or more circular queues; and one or more sets of registers.

8. The method of claim 1, wherein the plurality of textured pixel addresses correspond to a plurality of pixels, and one or more of the plurality of pixels is magnified.

9. The method of claim 8, wherein for each one of the one or more magnified pixels, each step in screen space corresponds to less then one texel step in texture space.

10. The method of claim 9, wherein the screen space comprises X and Y coordinates.

11. The method of claim 9, wherein the texture space comprises U and V coordinates.

12. A system comprising:
   a texture memory for storing texture data;
   one or more texture filters for receiving and filtering texture data;
   a buffer for storing a plurality of textured pixel addresses; and
   control logic configured to:
   examine a first set of two consecutive textured pixel addresses including a first textured pixel address and a second textured pixel address of a plurality of textured pixel addresses stored in the buffer to determine if the first set of two consecutive textured pixel addresses map to a same texel;
   wherein if the two consecutive textured pixel addresses do map to the same texel, then;
   transfer a set of texel data corresponding to said same texel from the texture memory to said texture filters for use in filtering a texture value;

filter the set of texel data in said texture filters to obtain a texture value for the first textured pixel address of the set of two consecutive textured pixel addresses; and filter the set of texel data in said texture filters to obtain a texture value for the second textured pixel address of the set of two consecutive textured pixel addresses;

remove the first set of two consecutive textured pixel addresses from the buffer; and examine a second set of textured pixel addresses including a former third and fourth textured pixel addresses.

13. The system of claim 12, wherein if the two consecutive textured pixel addresses do not map to the same texel, then the control logic is configured to:

transfer a set of texel data corresponding to the first textured pixel address of the two consecutive textured pixel addresses from the texture memory to said texture filters;

filter the set of texel data in said texture filters to obtain a texture value for the first textured pixel address;

remove the first textured pixel address from the buffer; and p1 examine a second set of two consecutive textured pixel addresses including the former second and third textured pixel addresses.

14. The system of claim 12, wherein at least a part of the plurality of textured pixel addresses are linearly ordered in the buffer.

15. The system of claim 12, wherein the buffer comprises one or more of:

one or more FIFO queues;
one or more circular queues; and
one or more sets of registers.

16. The system of claim 12, wherein each textured pixel address comprises U and V coordinates, wherein the U and V coordinates each comprises an integer and a fractional component.

17. The system of claim 16, wherein the same texel is determined based on the integer components of the U and V coordinates of the first set of textured pixel addresses.

18. The system of claim 16, wherein the one or more texture filters use both integer and fractional components of the U and V coordinates of each textured pixel address.

19. The system of claim 12, wherein the control logic is operable to examine integer components of the U and V coordinates of each textured pixel address to select the texel requirements of each textured pixel address.

20. The system of claim 12, wherein each textured pixel address corresponds to a pixel of a plurality of pixels.

21. The system of claim 20, wherein one or more pixels of the plurality of pixels is magnified.

22. The system of claim 21, wherein for each one of the one or more magnified pixels, each step in screen space corresponds to less then one texel step in texture space.

23. The system of claim 22, wherein the screen space comprises X and Y coordinates.

24. The system of clam 22, wherein the texture space comprises U and V coordinates.

25. The system of claim 12, wherein said map to the same texel indicates that the two consecutive textured pixel addresses correspond to a common set of texels that are useable by the filter units to filter a texture value for a corresponding pixel.

* * * * *

UNITED STATES PATENT AND TRADEMARK OFFICE
CERTIFICATE OF CORRECTION

| | | |
|---|---|---|
| PATENT NO. | : 7,145,570 B2 | Page 1 of 1 |
| APPLICATION NO. | : 10/317599 | |
| DATED | : December 5, 2006 | |
| INVENTOR(S) | : Emberling et al. | |

It is certified that error appears in the above-identified patent and that said Letters Patent is hereby corrected as shown below:

Column 18 Line 28, please delete "The method of claim 2," and substitute -- The method of claim 1, --;

Column 18 Line 64, please delete "to the same texel, then;" and substitute -- to the same texel, then: --;

Column 19 Line 21, please delete "and p1 examine a second set" and substitute -- and examine a second set --.

Signed and Sealed this

Sixth Day of March, 2007

JON W. DUDAS
*Director of the United States Patent and Trademark Office*